(12) United States Patent
Hayashi et al.

(10) Patent No.: US 12,059,636 B2
(45) Date of Patent: Aug. 13, 2024

(54) MIXING/CLARIFYING DEVICE

(71) Applicant: METAWATER Co., Ltd., Tokyo (JP)

(72) Inventors: Naoki Hayashi, Tokyo (JP); Yasuhiko Yamamoto, Tokyo (JP)

(73) Assignee: METAWATER Co., Ltd., Tokyo (JP)

( * ) Notice: Subject to any disclaimer, the term of this patent is extended or adjusted under 35 U.S.C. 154(b) by 419 days.

(21) Appl. No.: 17/595,241

(22) PCT Filed: Apr. 23, 2020

(86) PCT No.: PCT/JP2020/017542
§ 371 (c)(1),
(2) Date: Nov. 12, 2021

(87) PCT Pub. No.: WO2020/230582
PCT Pub. Date: Nov. 19, 2020

(65) Prior Publication Data
US 2022/0212127 A1 Jul. 7, 2022

(30) Foreign Application Priority Data
May 13, 2019 (JP) .................................. 2019-090721

(51) Int. Cl.
*B01F 101/00* (2022.01)
*B01D 21/01* (2006.01)
*B01F 25/435* (2022.01)
*C02F 1/52* (2023.01)

(52) U.S. Cl.
CPC ............ *B01D 21/01* (2013.01); *B01F 25/435*
(2022.01); *C02F 1/5245* (2013.01); *B01F 2101/305* (2022.01)

(58) Field of Classification Search
CPC ... B01D 21/01; B01D 21/2411; B01D 21/265
See application file for complete search history.

(56) References Cited

U.S. PATENT DOCUMENTS

| 4,265,740 A | 5/1981 | Luthi |
| 2010/0044286 A1 | 2/2010 | Menju et al. |

FOREIGN PATENT DOCUMENTS

| CN | 101654291 A | 2/2010 |
| CN | 202465418 U | 10/2012 |
| CN | 106345149 A | 1/2017 |
| CN | 106976930 A | 7/2017 |

(Continued)

OTHER PUBLICATIONS

Jul. 11, 2023, Notification of Reasons for Refusal issued by the Japan Patent Office in the corresponding Japanese Patent Application No. 2021-519344.

(Continued)

*Primary Examiner* — Bradley R Spies
(74) *Attorney, Agent, or Firm* — KENJA IP LAW PC

(57) ABSTRACT

Provided is a mixing/clarifying device 100 including a coagulant feeder 10 that feeds coagulant to water to be treated to obtain coagulant-containing water and a tank 20 in which the coagulant-containing water is mixed to form a floc and solid-liquid separation is performed. The tank 20 includes an outer cylinder 21 having an inflow port 210 that flows the coagulant-containing water into the tank 20 and an inner cylinder 22 arranged inserted from the upper side of the tank 20 to the lower side of the inflow port of the outer cylinder 21 and having a lower end open in the tank 20.

3 Claims, 8 Drawing Sheets

(56) References Cited

FOREIGN PATENT DOCUMENTS

| | | | |
|---|---|---|---|
| CN | 108821404 | A | 11/2018 |
| EP | 0311763 | B1 | 10/1993 |
| EP | 0625074 | B1 | 5/1998 |
| JP | 2010046627 | A | 3/2010 |
| JP | 2010214248 | A | 9/2010 |
| JP | 2014144442 | A | 8/2014 |
| JP | 2017047368 | A | 3/2017 |
| KR | 100883312 | B1 | 2/2009 |

OTHER PUBLICATIONS

Nov. 16, 2021, International Preliminary Report on Patentability issued in the International Patent Application No. PCT/JP2020/017542.
Oct. 26, 2023, Communication pursuant to Article 94(3) EPC issued by the European Patent Office in the corresponding European Patent Application No. 20805476.7.
Jan. 14, 2023, Office Action issued by the Intellectual Property Corporation of Malaysia in the corresponding Malaysian Patent Application No. PI2021006648.
Jun. 28, 2022, Office Action issued by the China National Intellectual Property Administration in the corresponding Chinese Patent Application No. 202080034837.1.
Jun. 30, 2020, International Search Report issued in the International Patent Application No. PCT/JP2020/017542.
Oct. 25, 2022, the Extended European Search Report issued by the European Patent Office in the corresponding European Patent Application No. 20805476.7.
Oct. 28, 2022, Office Action issued by the China National Intellectual Property Administration in the corresponding Chinese Patent Application No. 202080034837.1.

MIXING/CLARIFYING DEVICE

TECHNICAL FIELD

The present invention relates to a mixing/clarifying device.

BACKGROUND

In various water treatment facilities, membrane filtration devices have been adopted in which the water to be treated is filtered by a membrane to obtain treated water. As a membrane filtration device is used, a filtration membrane is clogged with solids or the like contained in the water to be treated. Therefore, it is necessary to periodically clean the filtration membrane in order to clear the clogging and regenerate the filtration function of the filtration membrane.

In recent years, the frequency of torrential rains has increased in many areas. For example, when the water to be treated is collected from lakes, rivers, etc., the turbidity concentration in the water to be treated increases sharply in response to the occurrence of torrential rain. If the water to be treated with a high turbidity concentration is supplied to the membrane filtration treatment, the solid load on the filtration membrane will increase and the washing cycle of the filtration membrane will be shortened.

A solid-liquid separation system in which a solid-liquid separation device is placed upstream of a filter device has been considered (see, for example, Patent Literature 1 (PTL 1)). According to the solid-liquid separation system disclosed in PTL 1, drinking water can be obtained by separating solids from suspended water with a solid-liquid separation device to obtain clean water, and treating the clean water with a filter device.

CITATION LIST

Patent Literature

PTL 1: JP2017047368(A)

SUMMARY

Technical Problem

However, in the above-mentioned known solid-liquid separation system, there is room for further improvement in the solid-liquid separation ability by the solid-liquid separation device. It is therefore an object of the present invention to provide a device with an excellent solid-liquid separation ability.

Solution to Problem

An object of the present invention is to solve the above-mentioned problem advantageously. The mixing/clarifying device according to the present invention includes a coagulant feeder that feeds coagulant to the water to be treated to obtain coagulant-containing water and a tank in which the coagulant-containing water is mixed to form flocs and solid-liquid separation is performed. The tank has an outer cylinder with an inflow port through which the coagulant-containing water is flowed into the tank and an inner cylinder arranged inserted from the upper side of the tank to the lower side of the inflow port of the outer cylinder and having a lower end open in the tank. According to the mixing/clarifying device of the present invention in which flocs are formed by mixing coagulant-containing water obtained by feeding coagulant to the water to be treated and separating the flocs from the liquid to clarify, a high solid-liquid separation ability can be exhibited.

Here, in the mixing/clarifying device according to the present invention, it is preferable that the tank includes a rapid stirrer that is located between an upper end of the outer cylinder and a lower end of the inner cylinder in a space between the outer cylinder and the inner cylinder and rapidly stirs the coagulant-containing water. If the mixing/clarifying device has a rapid stirrer located between the upper end of the outer cylinder and the lower end of the inner cylinder, floc forming efficiency in the tank can be increased effectively and as a result, a high solid-liquid separation ability can be exhibited.

Further, in the mixing/clarifying device according to the present invention, it is preferable that an inner wall of the outer cylinder is tapered toward the upper side of the tank, and the rapid stirrer is formed of a flow path defined by the inner wall of the outer cylinder and an outer wall of the inner cylinder. Alternatively, in the mixing/clarifying device according to the present invention, it is preferable that the outer wall of the inner cylinder is tapered toward the lower side of the tank, and the rapid stirrer is formed of a flow path defined by the inner wall of the outer cylinder and the outer wall of the inner cylinder. This is because, if the rapid stirrer is mounted as a flow path defined by the inner wall of the outer cylinder and the outer wall of the inner cylinder, at least one of them is formed into a tapered shape, the coagulant-containing water can be stirred with different stirring intensities in the tank, and thus a floc forming efficiency in the tank can be increased even more effectively. Then, as a result of increased floc formation efficiency, even higher solid-liquid separation ability can be exhibited by the mixing/clarifying device according to the present invention.

Further, in the mixing/clarifying device according to the present invention, it is preferable that the inner wall of the outer cylinder has a narrow flow path formed along a peripheral surface over at least one round of the peripheral surface of the inner wall, and that the narrow flow path forms the rapid stirrer. If the inner wall of the outer cylinder has a narrow flow path over at least one round of the peripheral surface, the coagulant-containing water can be stirred at different stirring intensities in the tank, and thus a floc formation efficiency in the tank can be increased even more effectively. Then, as a result of increased floc formation efficiency, even higher solid-liquid separation ability can be exhibited by the mixing/clarifying device of the present invention.

Advantageous Effect

According to the present invention, a device with an excellent solid-liquid separation ability can be provided.

DETAILED DESCRIPTION

The embodiments of the present invention will be described in detail below with reference to the drawings. In each drawing, the same reference sign is used to indicate the same component.

The mixing/clarifying device according to the present invention can be used when water to be treated containing solids is treated, without being particularly limited.

Here, examples of solid include sediment, sludge, organic substances, and the like, without being particularly limited.

Further, examples of the water to be treated include water collected from lakes, rivers, and the like, industrial wastewater generated in various plants, and wastewater generated in various treatment plants such as sewage treatment plants, urine treatment plants, waste-disposal facilities, and the like, without being particularly limited.

Figure 1:
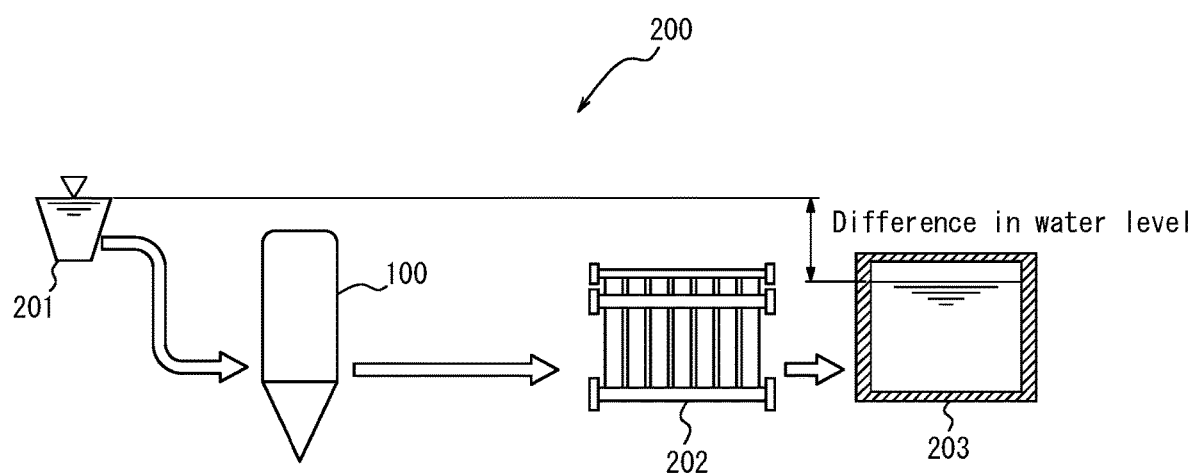
FIG. 1 is an image diagram of a mixing/clarifying device according to the present invention installed in a water treatment facility.

FIG. 1 is an image diagram of a mixing/clarifying device according to the present invention when it is installed in a water treatment facility. The water treatment facility 200 illustrated in FIG. 1 includes a primary water tank 201, a mixing/clarifying device 100, a membrane filtration device 202 and a secondary water tank 203. The primary water tank 201 stores water to be treated and supplies it to the mixing/clarifying device 100. Then, the water passed through and flowed out of the mixing/clarifying device 100 is supplied to the membrane filtration device 202 located downstream and filtered by the membrane filtration device 202. Then, the treated water passed through the membrane filtration device 202 is stored in the secondary water tank 203. The difference in height between the water level of the secondary water tank 203 and the water level of the primary water tank 201 (i.e., the difference in water level) causes flow of the water to be treated from the primary water tank 201 toward the secondary water tank 203. It is to be noted that the flow of water to be treated may be artificially generated by using a pump or other power sources, for example, without being limited to the aspect illustrated in FIG. 1.

In the water treatment facility 200, the mixing/clarifying device 100 is placed upstream of the membrane filtration device 202, and at least a part of the suspended solids in the water to be treated is removed at the stage before the water to be treated is flowed into the membrane filtration device 202. Thus, even if torrential rain occurs and the water to be treated with a temporarily high turbidity concentration flows into the primary water tank 201, the water to be treated can be supplied to the membrane filtration device 202 after turbidity is removed in the mixing/clarifying device 100, which can prevent excessively high solid load from being imposed on the membrane filtration device 202. Therefore, in the water treatment facility 200 including the mixing/clarifying device 100, it is possible to prevent the cleaning cycle of the membrane filtration device 202 from being shortened depending on the change in the turbidity concentration of the water to be treated. As a result of this, even if the water to be treated with a high turbidity concentration is flowed, the need to clean the membrane filtration device 202 at a high frequency is reduced, and the water treatment efficiency of the water treatment facility 200 can be increased.

An example of the mixing/clarifying device 100 according to the present invention will be described in detail with reference to FIG. 2. The mixing/clarifying device 100 according to the present invention includes a coagulant feeder 10 and a tank 20. The tank 20 further includes an outer cylinder 21 having an inflow port 210 through which the coagulant-containing water is flowed into the tank 20 and an inner cylinder 22 arranged inserted from the upper side of the tank 20 to the lower side of the inflow port 210 of the outer cylinder 21 and having a lower end open in the tank. The mixing/clarifying device 100 forms a floc by mixing the coagulant-containing water obtained by feeding coagulant to the water to be treated, and clarifies the water to be treated by separating the floc from the liquid through the solid-liquid separation. Thus, according to the mixing/clarifying device 100, a high solid-liquid separation ability can be exhibited.

The coagulant feeder 10 has a function of feeding coagulant to the water to be treated. The coagulant feeder 10 can be mounted by known members such as a storage tank, an injection pipe and a pump, without being particularly limited. More specifically, the coagulant feeder 10 can be mounted by a storage tank for storing the coagulant, an injection pipe connected to the storage tank and a pump that is attached to the injection pipe and can switch between injection and stop injection of the coagulant.

Figure 2:
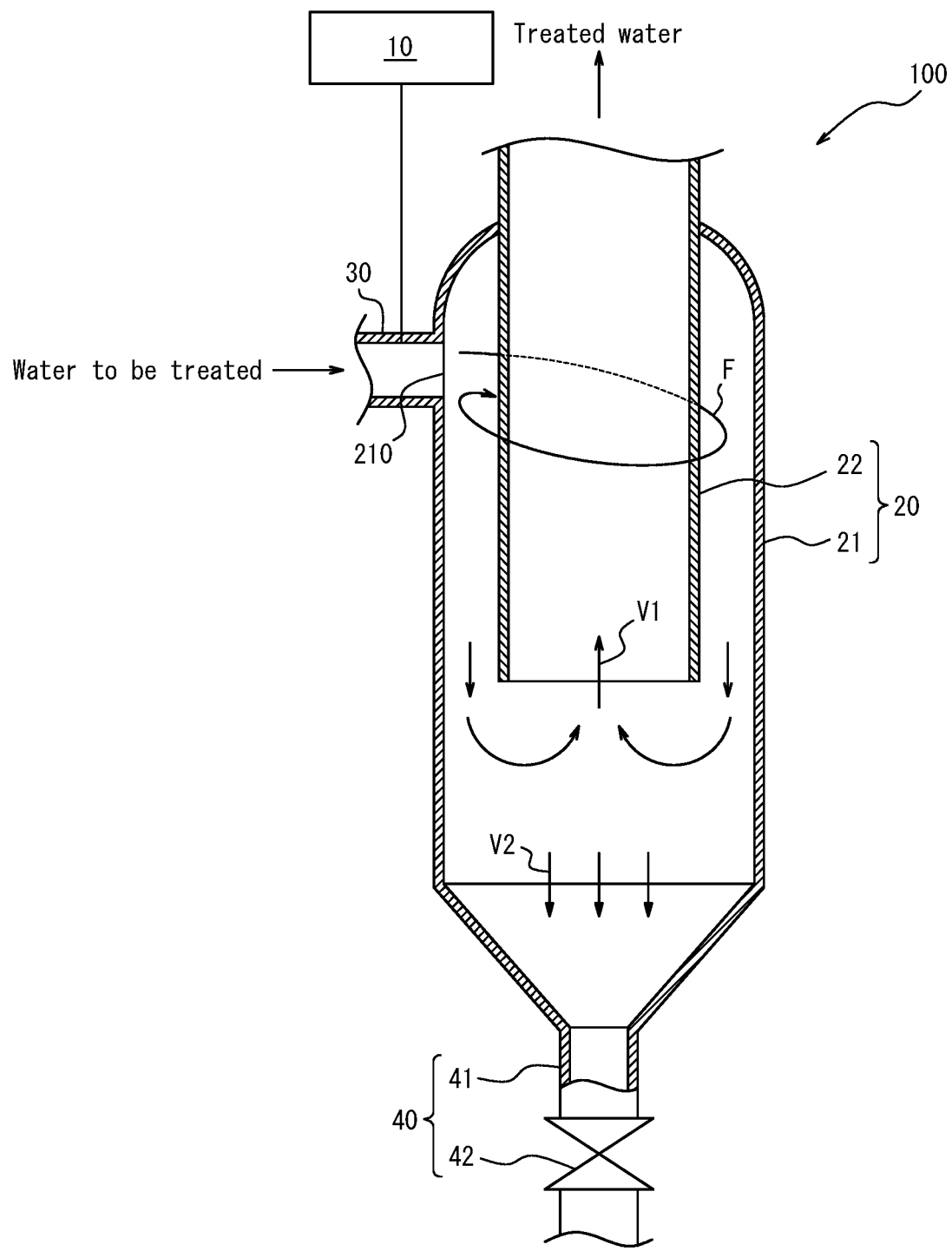
FIG. 2 is a diagram illustrating a schematic configuration of an example of the mixing/clarifying device according to the present invention.

FIG. 2 illustrates an aspect in which the coagulant feeder 10 is attached to the water to be treated inflow line 30 connected to the inflow port 210. As illustrated, the position at which the coagulant feeder 10 feeds coagulant to the water to be treated is preferably the upstream side of the inflow port 210. It is to be noted that the "upstream side" is a side closer to the supply source of the water to be treated (e.g., the primary water tank 201 illustrated in FIG. 1) based on the flow direction of the water to be treated. If the coagulant feeder 10 is placed such that the coagulant is fed to the water to be treated at the position on the upstream side of the inflow port 210, the time of mixing the water to be treated and the coagulant can be lengthened, and the solid-liquid separation ability of the mixing/clarifying device 100 can be further enhanced.

It is to be noted that, without being limited to the aspect illustrated in the figure, in the other example of the mixing/clarifying device according to the present invention, the coagulant feeder may be attached such that the coagulant is fed to the water to be treated in the tank. In such an aspect, it is preferable that the position at which the coagulant feeder feeds the coagulant to the water to be treated is close to the inflow port in the tank. More specifically, it is preferable that the coagulant feeder is placed at a position at which the coagulant can be fed to the water to be treated immediately after flowing into the tank. With such a disposition, the time of mixing the water to be treated with the coagulant can be increased, and the solid-liquid separation ability of the mixing/clarifying device can be further enhanced.

Examples of the coagulant include an aluminum-based coagulant such as aluminum sulfate and polyaluminum chloride; and an iron-based coagulant such as ferric chloride, ferric sulfate, and polysilicate iron, without being particularly limited. The injection amount and the like of the coagulant can be controlled as desired according to the turbidity or the like of the water to be treated.

The tank 20 has a function of mixing the coagulant-containing water flowed into the tank 20 through the inflow port 210 to form a floc and then performing solid-liquid separation. The coagulant-containing water flowed through the inflow port 210 into the tank 20 can flow down in the tank 20 through the flow path defined by the inner periphery of the outer cylinder 21 and the outer periphery of the inner cylinder 22 while a part thereof forming a flow as schematically illustrated by the arrow F and circling around the inner cylinder 22. The tank 20 can be configured by a water tank configured to allow the coagulant-containing water flowed into the tank through the inflow port 210 to flow, as treated water, out of the tank by the inner cylinder 22. The tank 20 can be mounted by, for example, a pressure-resistant water tank with a cylindrical body portion (corresponding to the outer cylinder 21) having a round-shaped cross section, without being particularly limited. In this case, the inner cylinder 22 may also have a cylindrical body portion having a round-shaped cross section, and the outer cylinder 21 and the inner cylinder 22 may share the same axis, or each axis of them may not be aligned. The tank 20 may include a solid matter extraction mechanism at the bottom thereof. As illustrated, the outer cylinder 21 of the tank 20 is closed by being connected to the outer wall of the inner cylinder 22 at the top. In other words, the space between the outer cylinder 21 and the inner cylinder 22 is closed at the top of the tank 20.

In the tank 20, the space between the outer cylinder 21 and the inner cylinder 22 acts as a floc formation region for stirring the coagulant-containing water to form a floc. In the floc formation region, stirring action may not only form a floc but also increase the size of the floc. On the other hand, the flow rate of the coagulant-containing water decreases near the lower end of the inner cylinder 22 and the region lower than the lower end of the inner cylinder 22. Then, finally, the floc formed in the floc formation region settles down at a settling velocity V2. At the near lower end of the inner cylinder 22, although the liquid is attracted by the upward flow flowing at a flow velocity V1 in the inner cylinder 22 and tries to flow out of the tank 20, most of the floc that is heavier than the liquid and settles down at a settling velocity V2 faster than the flow velocity V1 goes down to the bottom of the tank 20 against the flow velocity V1. Then, the liquid flows out of the tank 20 and flocculated solids accumulate at the bottom of the tank 20, and as a result the coagulant-containing water is clarified. In this manner, the region lower than the lower end of the inner cylinder 22 acts as a solid-liquid separation region. The liquid flowed out of the tank 20 may accompany solids that cannot be separated from the liquid, but its amount is much less than that of the solids of the coagulant-containing water flowed into the tank 20.

It is effective to increase the time for stirring the coagulant-containing water to enhance the solid-liquid separation ability. As described above, since the space between the outer cylinder 21 and the inner cylinder 22 acts as a floc formation region, the longer the inner cylinder 22, the larger the size of the floc formation region can be. On the other hand, the solid-liquid separation region needs to have a length enough for settling down the floc formed in the floc formation region. The length of the inner cylinder 22 can be determined such that the floc forming ability and the solid-liquid separation ability is balanced.

As illustrated in FIG. 2, it is preferable that the lower portion of the tank 20 is tapered downward. More specifically, as illustrated in FIG. 2, the outer cylinder 21 forming the tank 20 may include a straight body portion and further a tapered portion being continuous from the straight body portion. According to the tank 20 having the above-described shape, floc settlement can be promoted, and as a result, the solid-liquid separation ability of the mixing/clarifying device 100 can be further enhanced.

Furthermore, the tank 20 may include a solid discharge mechanism 40 underneath. In the example illustrated, the solid discharge mechanism 40 is composed of a solid discharge pipe 41 and a solid discharge valve 42. The solid discharge valve 42 may be open when the solids accumulated on the bottom of the tank 20 are discharged, and is closed at other times. When to open the solid discharge valve 42 can be set as desired.

From the viewpoint of further enhancing the solid-liquid separation ability of the mixing/clarifying device 100, it is preferable that the tank 20 includes a rapid stirrer for rapidly stirring the coagulant-containing water in the space between the outer cylinder 21 and the inner cylinder 22 and in the region between the upper end of the outer cylinder 21 and the lower end of the inner cylinder 22. Such a rapid stirrer may be mounted to any structural parts, without being particularly limited, as long as the velocity (first velocity) of the flow of the coagulant-containing water immediately after it is flowed into the tank 20 is faster than a predetermined velocity. The "predetermined velocity" is preferably a velocity that is faster than the velocity at which the coagulant-containing water flows into the tank 20 through the inflow port 210, and the "predetermined velocity" is more preferably a velocity that is faster than the flow rate sufficient for circling around the space between the outer cylinder 21 and the inner cylinder 22 at least once. Various mounting aspects of the rapid stirrer will be described below with reference to FIGS. 3 to 6. It is to be noted that, in FIGS. 3 to 5, although the coagulant feeder is not illustrated, each mixing/clarifying device illustrated in the figures includes a coagulant feeder.

Figure 3:
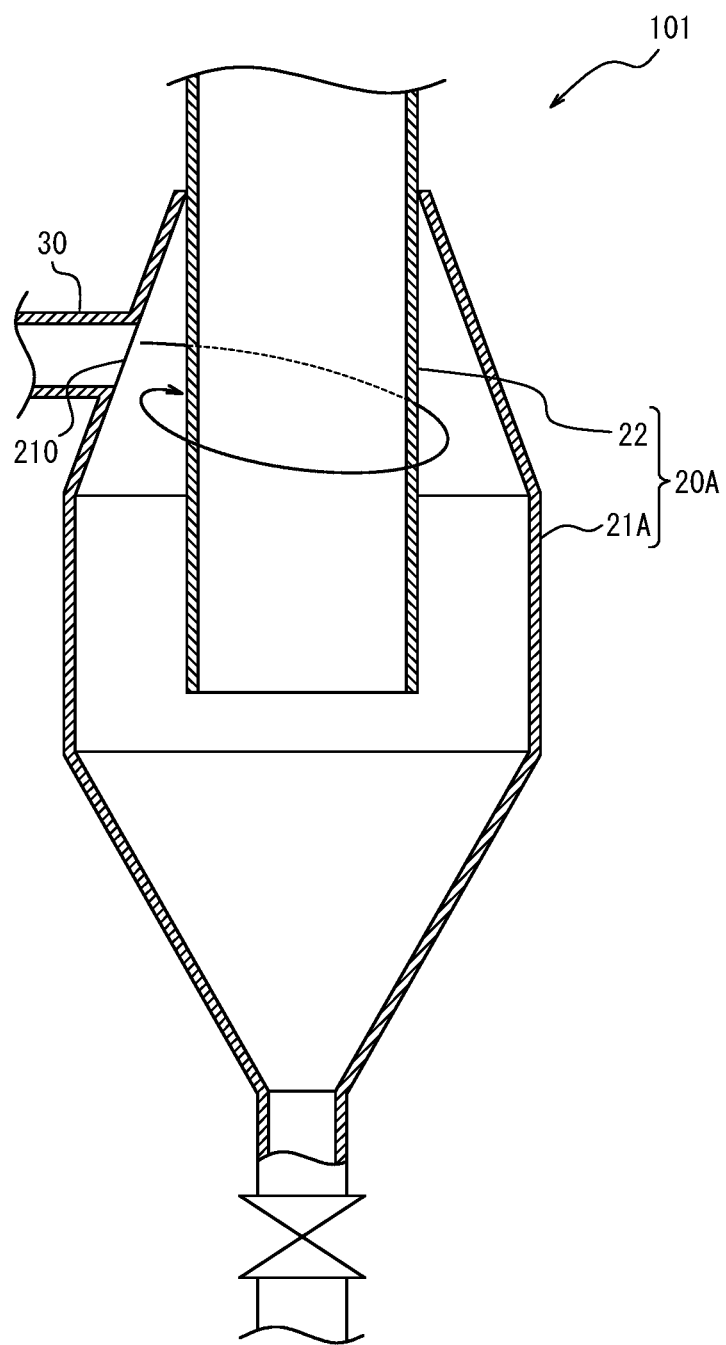
FIG. 3 is a diagram schematically illustrating an aspect according to a first example of a rapid stirrer that can be provided to the mixing/clarifying device of the present invention.

FIG. 3 is a diagram schematically illustrating an aspect according to a first example of a rapid stirrer that can be provided to the mixing/clarifying device of the present invention. In the mixing/clarifying device 101 illustrated in FIG. 3, the inner wall of the outer cylinder 21A is tapered toward the upper side of the tank 20A, and the rapid stirrer is formed by the flow path defined by the inner wall of the outer cylinder 21A and the outer wall of the inner cylinder 22. The coagulant-containing water flowed into the tank 20A through the water to be treated inflow line 30 gradually flows down toward the lower portion of the tank 20A while circling around the flow path. At this time, as the cross-sectional area of the flow path increases toward the lower portion, the flow rate of the coagulant-containing water flowing through the flow path also decreases. Therefore, compared with the flow rate immediately after flowing into the tank 20A, the flow rate gradually slows down. As a result, the coagulant-containing water, which is rapidly stirred by flowing through the flow path with a rapid flow rate immediately after its inflow, is slowly stirred as it flows down the flow path. Such a change in the stirring intensity effectively contributes to an increase in the size of the floc.

Thus, the mixing/clarifying device 101 according to the present invention has even better solid-liquid separation ability.

Figure 4:
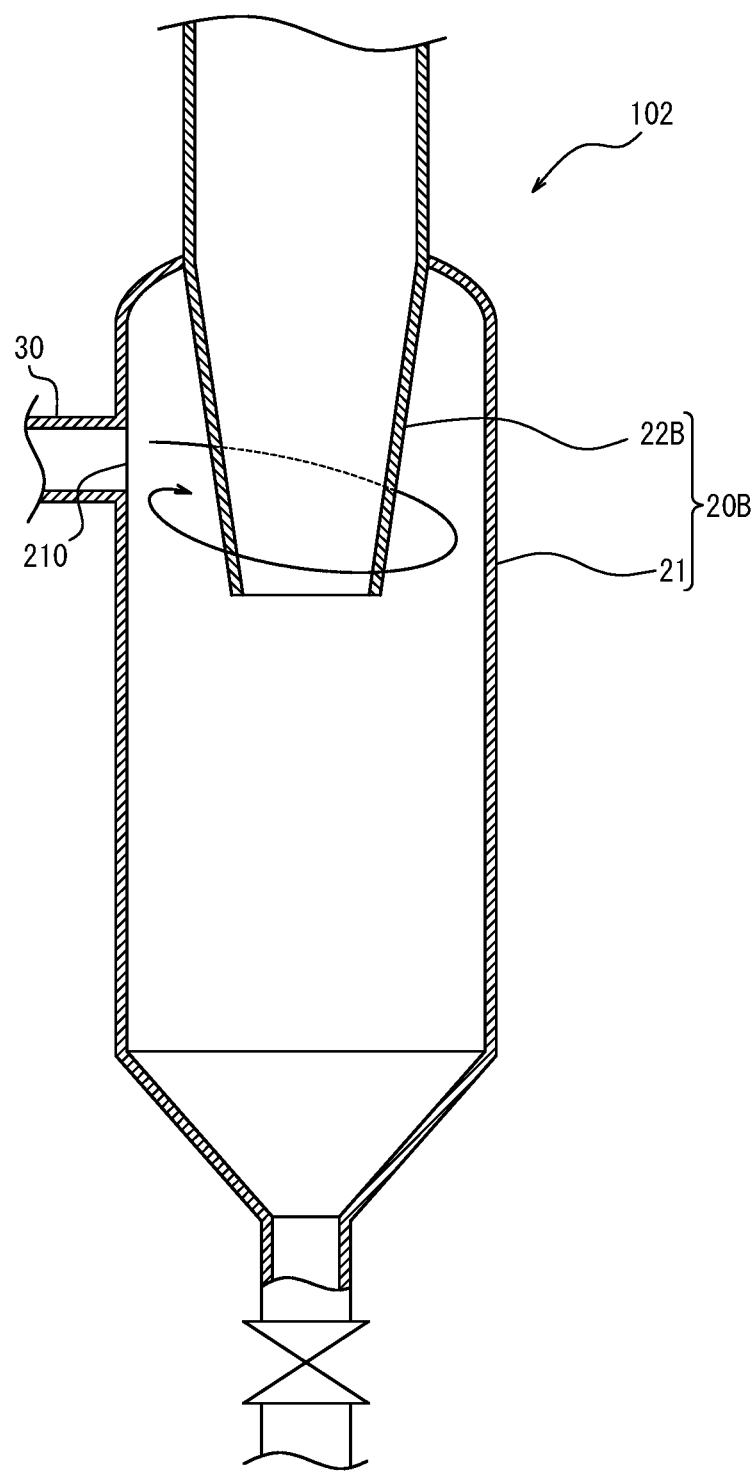
FIG. 4 is a diagram schematically illustrating an aspect according to a second example of the rapid stirrer that can be provided to the mixing/clarifying device of the present invention.

FIG. 4 is a diagram schematically illustrating an aspect according to a second example of the rapid stirrer that can be provided to the mixing/clarifying device of the present invention. In the mixing/clarifying device 102 illustrated in FIG. 4, the outer wall of the inner cylinder 22B is tapered toward the lower side of the tank 20B, and the rapid stirrer is formed by the flow path defined by the inner wall of the outer cylinder 21 and the outer wall of the inner cylinder 22B. As with the aspect illustrated in FIG. 3, the coagulant-containing water flowed into the tank 20B through the water to be treated inflow line 30 gradually flows down toward the lower portion of the tank 20B while circling around the flow path. According to the same principle as that illustrated in FIG. 3, the rapid stirring action on the coagulant-containing water that occurred immediately after inflow gradually disappears as the water flows down the flow path, and is switched to the slow stirring action. Such a change in stirring intensity can effectively contribute to an increase in floc size. Thus, the mixing/clarifying device 102 according to this example also has an even better solid-liquid separation ability.

Figure 5:
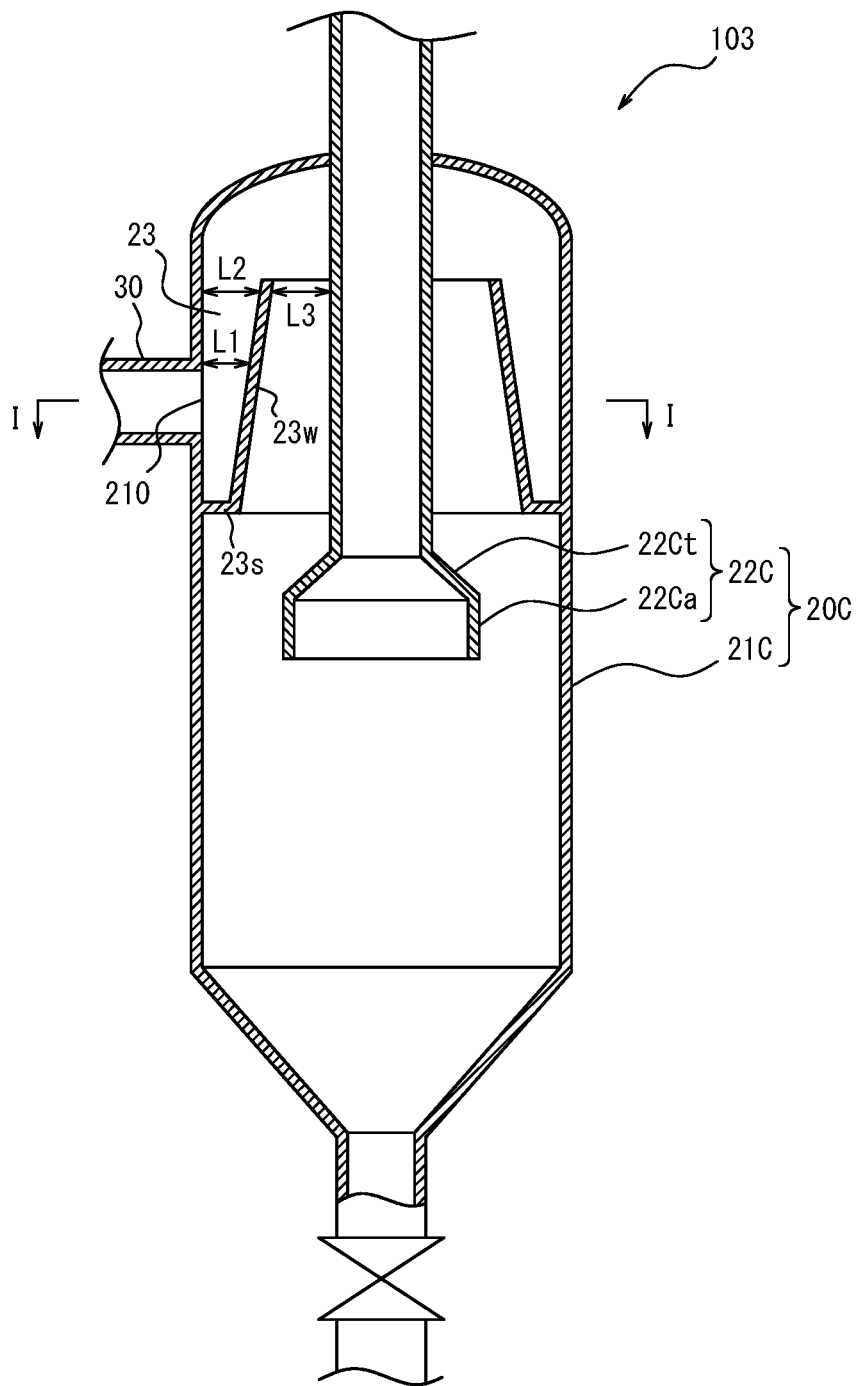
FIG. 5 is a diagram schematically illustrating an aspect according to a third example of the rapid stirrer that can be provided to the mixing/clarifying device of the present invention.

FIG. 5 is a diagram schematically illustrating an aspect according to a third example of the rapid stirrer that can be provided to the mixing/clarifying device of the present invention. In the mixing/clarifying device 103 illustrated in FIG. 5, the inner wall of the outer cylinder 21C has a narrow flow path 23 formed along the peripheral surface over at least one round of the peripheral surface of the inner wall. The narrow flow path 23 rapidly flows the coagulant-containing water flowed in through the inflow port 210 and acts as a rapid stirrer. The narrow flow path 23 can be defined by a narrow flow path wall 23w, a narrow flow path support portion 23s and an inner wall surface of the outer cylinder 21C. The narrow flow path wall 23w may be parallel with the inner wall surface of the outer cylinder 21C or may be inclined with respect to the inner wall surface of the outer cylinder 21C. When the narrow flow path wall 23w is inclined with respect to the inner wall surface of the outer cylinder 21C, it is preferable that the narrow flow path wall 23w is inclined such that the distance between the inner wall surface of the outer cylinder 21C and the narrow flow path wall 23w on the upper side of the narrow flow path wall 23w is larger than the distance between the inner wall surface of the outer cylinder 21C and the narrow flow path wall 23w on the lower side of the narrow flow path wall 23w (e.g., the angle between them is more than 0° and 30° or less). In the example illustrated in FIG. 5, when the distance between the inner wall surface of the outer cylinder 21C and the narrow flow path wall 23w near the inflow port 210 is defined as L1 and the distance between the inner wall surface of the outer cylinder 21 and the narrow flow path wall 23w at the upper end of the narrow flow path wall 23w is defined as L2, L1<L2. Furthermore, in the example illustrated in FIG. 5, when the distance between the wall surface on the inner cylinder 22C side of the narrow flow path wall 23w and the outer wall surface of the inner cylinder 22C at the upper end of the narrow flow path wall 23w is defined as L3, L2 equals L3 or L3 is larger than L2. That is, in the example illustrated in FIG. 5, the relationships of L1<L2 and L2≤L3 are established.

The narrow flow path support portion 23s is attached by adhering to the inner peripheral surface over the entire circumference of the inner wall surface of the outer cylinder 21C. This can avoid short circuit of flow of the coagulant-containing water at the rapid stirrer. Therefore, the time for stirring the coagulant-containing water in the tank 20C can be increased, and as a result, flocs are formed, and further, the growth of flocs can be further promoted.

Figure 6:
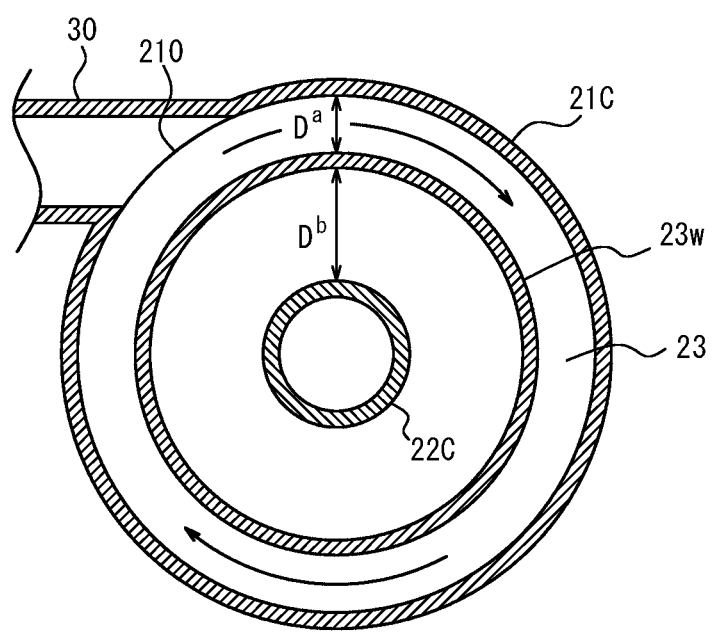
FIG. 6 is a cross-sectional view taken along I-I in FIG. 5.

In order to describe the structure of the narrow flow path 23, a cross-sectional view taken from the line I-I in FIG. 5 is illustrated in FIG. 6. The I-I cross section is a plane that passes through the center of the inflow port 210 and is perpendicular to the vertical direction of the tank 20C. As obvious from FIG. 6, the narrow flow path 23 is formed over the entire circumference of the inner wall of the outer cylinder 21C without interruption. Here, when comparing, on the cross-section illustrated in FIG. 6, the distance $D^a$ between the narrow flow path wall 23w and the inner wall surface of the outer cylinder 21C and the distance $D^b$ between the narrow flow path wall 23w and the outer wall surface of the inner cylinder 22C, $D^a<D^b$. If the relationship of $D^a<D^b$ is satisfied, after the coagulant-containing water flowed into the tank 20C through the inflow port 210 is flowed into the rapid stirring action in the narrow flow path 23, the coagulant-containing water can be slowly stirred in a region extending between the outer wall of the inner cylinder 22C and the narrow flow path wall 23w (hereinafter referred to also as "slow stirring portion"), and as a result floc formation can be efficiently promoted.

The coagulant-containing water flows out of the open end on the top side of the narrow flow path 23 after circling around the narrow flow path 23 and reaches the slow stirring portion. Further, the coagulant-containing water flows down while circling around the inner cylinder 22C at the slow stirring portion.

Note that, in FIG. 6, $D^a$ and $D^b$ have constant values, respectively, but are not limited to the aspect illustrated in FIG. 6. For example, in the mixing/clarifying device according to a variation, the narrow flow path 23 may be designed such that the value of $D^a$ near the inflow port 210 will be the smallest and that of near the opposite side of the inflow port 210 will be the largest. In this case, the stirring intensity inside the narrow flow path 23 can be changed in a plane perpendicular to the vertical direction of the tank 20C, and thus floc formation can be further promoted.

Furthermore, as illustrated in FIG. 5, the inner cylinder 22C has a tapered portion 22Ct on the lower side, more preferably, on the lower side of the narrow flow path supporting portion 23s. With the tapered portion 22Ct, the tapered portion 22Ct exhibits an action to promote settling of flocs, and thus settling efficiency of flocs contained in the coagulant-containing water that flows down through the slow stirring portion can be further increased.

Moreover, as illustrated in FIG. 5, the inner cylinder 22C has a large-bore end portion 22Ca provided continuously over the tapered portion 22Ct. The large-bore end portion 22Ca makes it difficult for small-sized flocs, and the like, to be sucked into the inner cylinder 22C. The bore size of the large-bore end portion 22Ca is not particularly limited, and may be selected, for example, from those small enough to form upward flow in the inner pipe 22C and large enough to create flow lower than the settling velocity V2 as desired.

As described with reference to FIGS. 3 to 6, in the mixing/clarifying device according to the present invention, when a rapid stirrer that can be mounted by various aspects is adopted, floc formation and growth can be promoted in the coagulant-containing water, and the solid-liquid separation ability of the device can be further enhanced. Other configuration examples of enhancing the solid-liquid separation ability of the device include helical ribs as illustrated with reference to FIG. 7.

Figure 7:
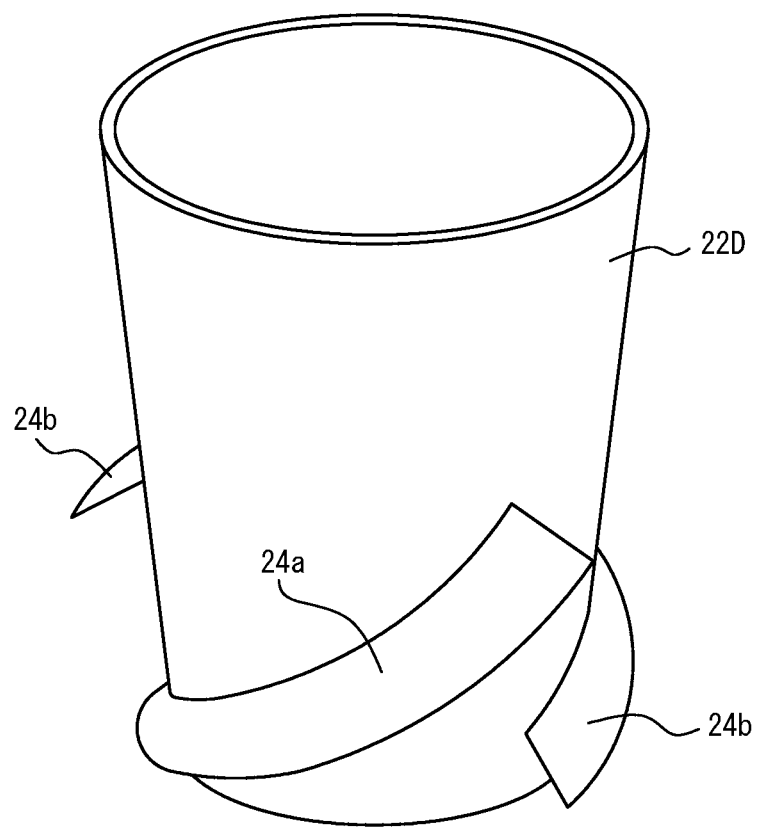
FIG. 7 is a schematic configuration diagram of an example of an inner cylinder provided with helical ribs at its lower part.

FIG. 7 illustrates a schematic configuration of an inner cylinder 22D provided with helical ribs at its lower portion. The inner cylinder 22D having a configuration as illustrated can be adopted by a mixing/clarifying device of any aspect illustrated with reference to FIGS. 2 to 6, without being particularly limited. As illustrated in FIG. 7, the inner cylinder 22D is provided with a helical first rib 24a and second rib 24b at its lower portion. It should be noted that, without being limited to the aspect illustrated, the inner cylinder may have three or more ribs or one rib. The first rib 24a and the second rib 24b of such shape act each to promote floc settling. Therefore, the solid-liquid separation ability of the mixing/clarifying device including the first rib 24a and the second rib 24b can be further enhanced. Further, in FIG. 7, although the helical first rib 24a and second rib 24b are placed with respect to the tapered outer wall of the inner cylinder 22D, the shape of the inner cylinder 22D is not limited to the tapered shape. More specifically, at least one helical rib may be provided to the straight body type inner cylinder 22D.

Although not illustrated, the helical rib may be provided to the inner wall of the outer cylinder forming the tank, not to the inner cylinder. Also in this case, the helical rib can exhibit floc settling promotion effect as with the case where the helical rib is provided to the inner cylinder. Further, the position of the helical rib in the vertical direction of the mixing/clarifying device is not particularly limited, and, for example, it may be provided below the inflow port through which the coagulant-containing water is flowed into the tank.

Although some examples of the mixing/clarifying device according to the present invention have been described, the mixing/clarifying device according to the present invention is not limited to the above described content.

Although the present invention will be further described in detail below using an example, the present invention is not limited to the aspect adopted by the example.

Example

The water to be treated was treated, under the following conditions, by using a test machine having the same structure as that of the water treatment facility 200 illustrated in FIG. 1. Note that the structure of the mixing/clarifying device adopted by this example was according to the structure illustrated in FIG. 2. More specifically, the mixing/clarifying device has the following structure.
<Structure of the Mixing/Clarifying Device>
 Inflow line of water to be treated: 15 mm in diameter
 Inflow port diameter: 15 mm
 Inner cylinder diameter: 65 mm
 Outer cylinder diameter: 100 mm
 Inner cylinder length: 400 mm
 Distance from the lower end of the inner cylinder to the lower end of the straight body portion of the outer cylinder: 100 mm
<Treatment Conditions>
 Coagulant: Polyaluminum chloride (injection rate: 80 mg/L)
 Inflow velocity of coagulant-containing water to the mixing/clarifying device: 1.34 L/min.
<Turbidity Measurement>
 The water to be treated (before the coagulant was added) and the treated water immediately after flowing out of the mixing/clarifying device were sampled, diluted, and measured for turbidity with a turbidity meter ("WA6000" by NIPPON DENSHOKU INDUSTRIES Co., Ltd.). The results obtained according to the above are illustrated in FIG. 8.

Figure 8:
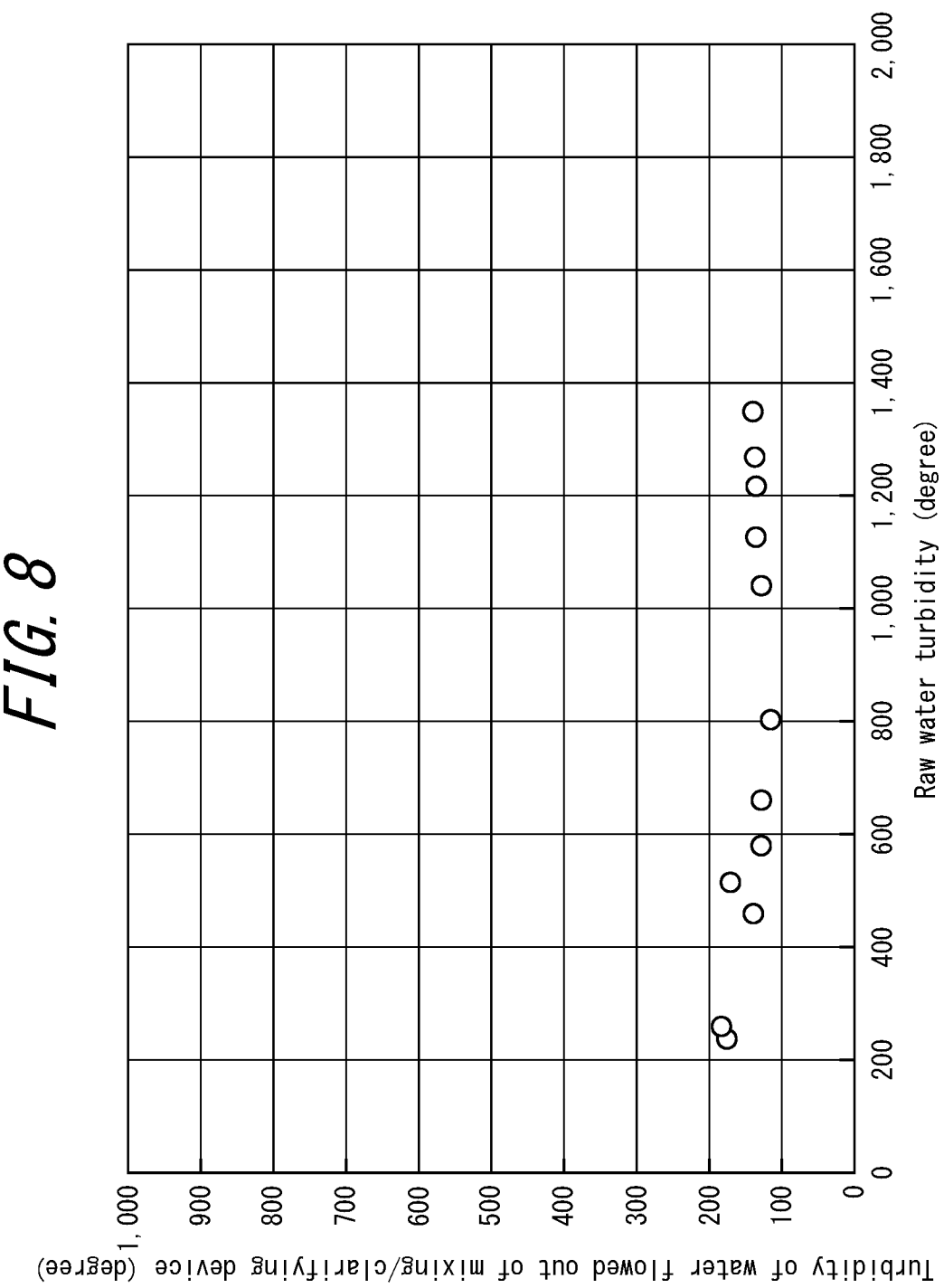
FIG. 8 is a graph showing the turbidity of the water flowed out of the mixing/clarifying device with respect to the turbidity of raw water when the water to be treated (raw water) is treated by using the water treatment facility illustrated in FIG. 1.

From FIG. 8, according to the mixing/clarifying device of the present invention, it can be seen that the turbidity of the water flowing out of the mixing/clarifying device could be maintained substantially constant even if the turbidity of the raw water fluctuated. Therefore, it can be seen that a high solid-liquid separation ability could be exerted regardless of the raw water turbidity. Therefore, in such a water treatment facility, even if the turbidity concentration in the raw water changes irregularly due to occurrence of torrential rain or the like, the solid content load of the membrane filtration device does not temporarily increase excessively. Thus, according to the mixing/clarifying device, it can be seen that water treatment efficiency of the water treatment facility can be increased.

INDUSTRIAL APPLICABILITY

According to the mixing/clarifying device of the present invention, a high solid-liquid separation ability can be exhibited.

REFERENCE SIGNS LIST

10 Coagulant feeder
20, 20A, 20B, 20C Tank
21, 21A, 21C Outer cylinder
22, 22B, 22C, 22D Inner cylinder
22Ca Large-bore end portion
22Ct Tapered portion
23 Narrow flow path
23s Narrow flow path support portion
23w Narrow flow path wall portion
24a First rib
24b Second rib
30 Water to be treated inflow line
40 Solid discharge mechanism
41 Solid discharge pipe
42 Solid discharge valve
100, 101, 102, 103 Mixing/clarifying device
200 Water treatment facility
201 Primary water tank
202 Membrane filtration device
203 Secondary water tank
210 Inflow port

The invention claimed is:
1. A mixing/clarifying device, comprising:
 a coagulant feeder that feeds coagulant to water to be treated to obtain coagulant-containing water; and
 a tank in which the coagulant-containing water is mixed to form a floc and solid-liquid separation is performed, wherein
  the tank includes an outer cylinder having an inflow port through which the coagulant-containing water is flowed into the tank and an inner cylinder arranged inserted from an upper side of the tank to a lower side of the inflow port of the outer cylinder and having a lower end open in the tank,
  the tank further includes a rapid stirrer that is located between an upper end of the outer cylinder and a lower end of the inner cylinder in a space between the outer cylinder and the inner cylinder and rapidly stirs the coagulant-containing water, and
  the rapid stirrer further includes a flow path defined by a flow path wall, a flow path support portion and an inner wall surface of the outer cylinder, wherein the flow path wall is inclined such that a distance between the inner wall surface of the outer cylinder and the flow path wall on an upper side of the flow path wall is larger than a distance between the inner wall surface of the outer cylinder and the flow path wall on a lower side of the flow path wall.

2. The mixing/clarifying device according to claim 1, wherein an inner wall of the outer cylinder is tapered toward an upper side of the tank, and the rapid stirrer is formed by a flow path defined by the inner wall of the outer cylinder and an outer wall of the inner cylinder.

3. The mixing/clarifying device according to claim 1, wherein, the outer wall of the inner cylinder is tapered toward a lower side of the tank, and the rapid stirrer is formed by a flow path defined by the inner wall of the outer cylinder and the outer wall of the inner cylinder.

* * * * *